UNITED STATES PATENT OFFICE.

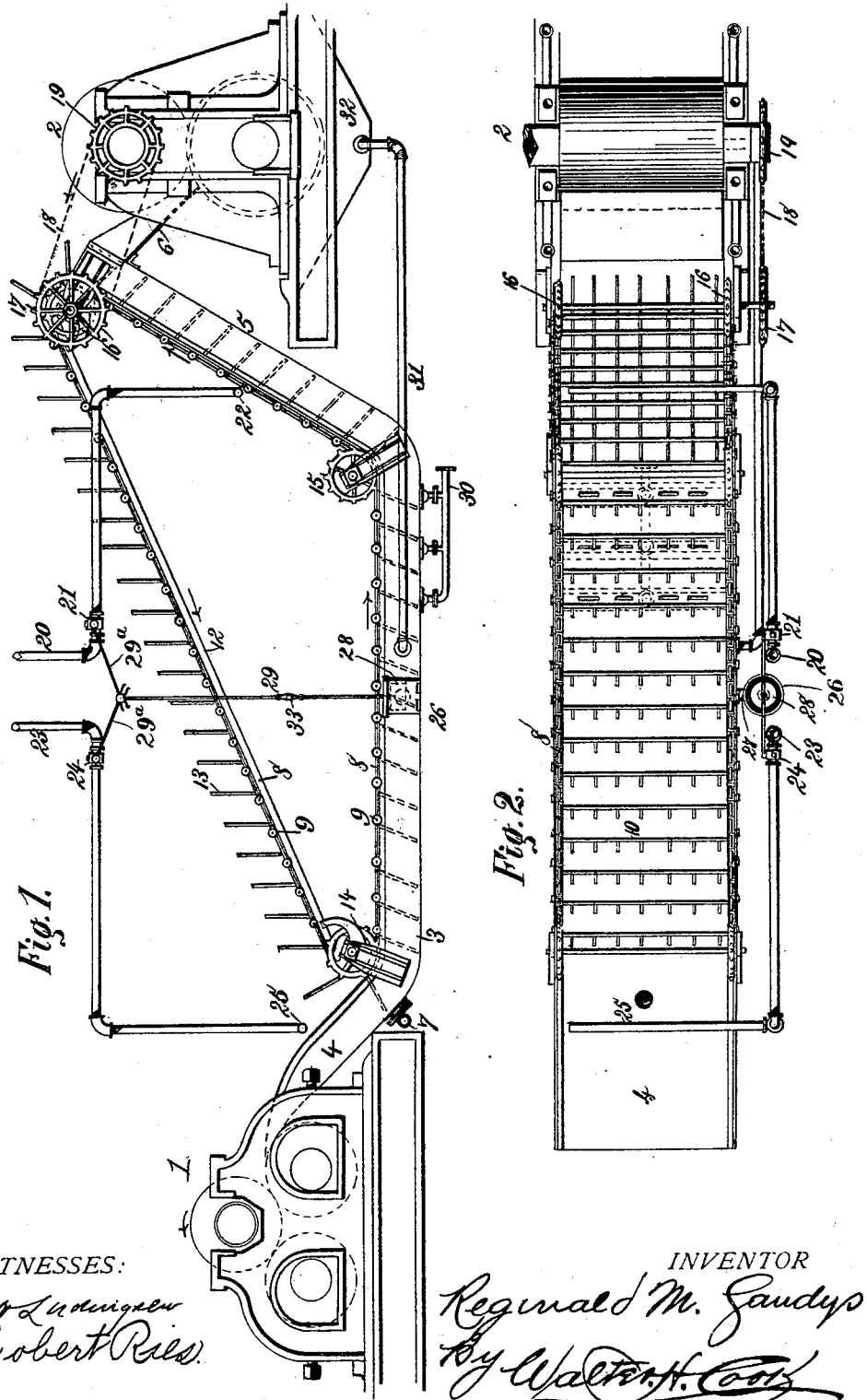

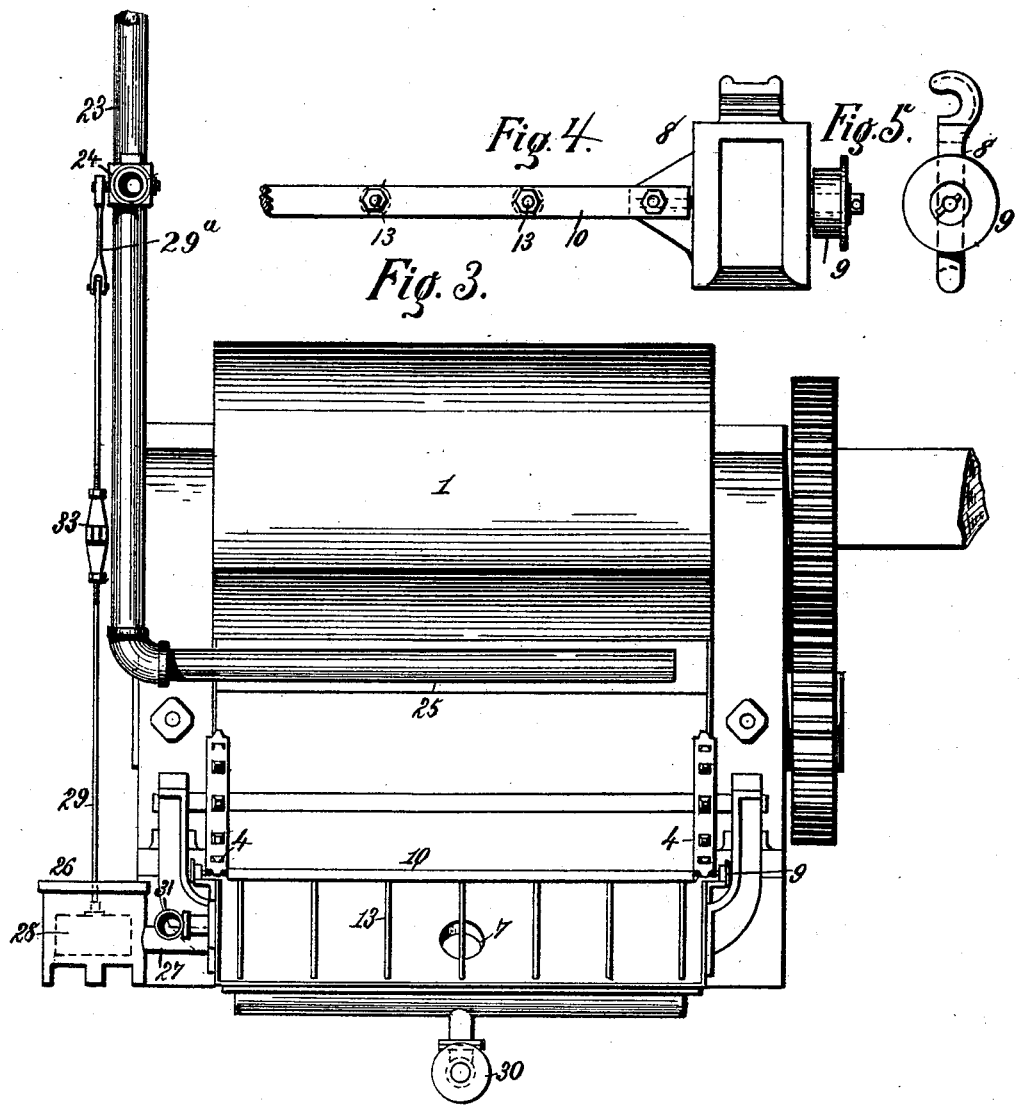

REGINALD MELVILL SANDYS, OF NEW ORLEANS, LOUISIANA.

DIFFUSION APPARATUS.

SPECIFICATION forming part of Letters Patent No. 459,654, dated September 15, 1891.

Application filed August 7, 1890. Serial No. 361,407. (No model.)

*To all whom it may concern:*

Be it known that I, REGINALD MELVILL SANDYS, a subject of the Queen of Great Britain, residing at New Orleans, in the parish of Orleans and State of Louisiana, have invented certain new and useful Improvements in Diffusion Apparatus; and I do hereby declare that the following is a full, clear, and exact description of the same, reference being had to the annexed drawings, making a part of this specification, and to the figures of reference marked thereon.

This invention has for its object to provide an improved diffusion apparatus, whereby the proportion of juice extracted from all fiber-containing plants is materially increased and the product rendered more perfect and desirable.

To accomplish this object my invention involves the features of construction, the combination or arrangement of devices, and the principles of operation hereinafter described and claimed, reference being made to the accompanying drawings, in which—

Figure 1 is a side elevation of a diffusion apparatus embodying my invention. Fig. 2 is a detail top plan view omitting one of the roller-mills. Fig. 3 is a detail end elevation omitting the elevator-rake and one of the roller-mills. Fig. 4 is a detail broken view of one of the chain-links of the elevator-rake. Fig. 5 is an end view of the same.

In order to enable those skilled in the art to make and use my invention, I will now describe the same in detail, referring to the drawings, wherein—

The numeral 1 indicates a roller-mill of any suitable construction, but preferably of the three-roller type, and 2 a similar roller-mill, preferably of the two-roller type. The diffusion-trough 3 is arranged horizontally between the two mills and at one end inclined upwardly, as at 4, for receiving the bagasse or other fiber-containing plant from the mill 1, and at the opposite end inclines upwardly, as at 5, for delivering the bagasse to the chute 6, by which the fiber is conveyed to the two rollers of the mill 2. The inclined end 4 of the trough is provided with an overflow opening or outlet 7 for carrying off the excess of liquid from the trough. The elevator-rake by which the fiber is carried along the horizontal part of the trough and upwardly to the chute 6 is composed of chain-links 8, having rollers 9 and cross-bars 10, such rollers traveling on and being supported by the upper edges of the trough and by the inclined track or guideway 12. The cross-bars 10 of the chain-links are provided with projecting fingers or arms 13 for raking and elevating or carrying the fibrous matter. The elevator constructed as described moves round and in engagement with sprocket-wheels 14, 15, and 16, the sprocket-wheel 16 being rigidly secured to the shaft of a sprocket-wheel 17, connected by the driving belt or chain 18 with a wheel 19, revolved by one of the rollers of the roller-mill 2. The required water is supplied to the trough 3 through the medium of the pipe 20, having the valve 21 and connected with the transverse distributing-pipe 22, and chemical water—such as lime-water or other defecating agent—is supplied to the trough by the pipe 23, having the valve 24 and connected with the transverse distributing-pipe 25. A vessel 26 is connected with one side of the trough by the pipe 27, and contains a float 28, having a rod connection 29 with the two valves 21 and 24, the construction being such that the level of the liquid in the trough and in the vessel is the same, and consequently the float will so govern the action of the valves as to automatically control or regulate the supply of liquid through both pipes 20 and 23. The stems of the valves 21 and 24 are provided with levers 29ª, having forked ends, which are connected with a cross-pin upon the upper end of the rod 29, whereby the rise and fall of the latter operates both valves simultaneously, closing them as the rod is lifted by the float and opening them as it is lowered. The distributing-pipes 22 and 25 are in practice perforated for the purpose of uniformly distributing the liquid upon the fiber-containing plants in the trough. A steam-supply pipe 30 communicates through the bottom of the trough with the interior thereof for the purpose of delivering steam into the latter, and in practice the openings through which the steam-pipe communicates with the trough will be covered with wire-cloth or perforated sheet of metal. The trough is connected by the pipe 31 with the juice-tray 32 of the roller-mill 2 in such manner that the juice expressed from the plants by the rollers of the mill 2 will be deposited in the juice-tray and conducted by the pipe 31 into the trough, to be there subjected to the action of the lime-water or other chemical purifying-liquid. In operation the trough is filled with water and the rollers of the mill 1 deliver the bagasse of other fiber-containing plants into the upwardly inclined portion 4 of the trough, and the fingers or arms of the endless elevator-rake drag the plant through the horizontal portion of the trough and raise such plants through the upwardly-inclined portion 5 of the trough, from which it passes to the chute 6 between the two rollers of the mill 2. The juice expressed by this mill flows into the tray 32, and by the pipe 31 is conveyed into the horizontal portion of the trough, where it is subject to the action of the lime-water or other chemical liquid employed for purifying purposes. The connecting-rod 29 between the float 28 of the valves 21 and 24 is provided with a turn-buckle 33 for the purpose of varying the length of such connecting-rod and thereby causing the valves to open more or less, by which means the supply of fresh and chemical water is regulated. The liquid issuing from the overflow or opening outlet 7 is collected, treated, evaporated, and made into sugar in the usual way.

Having thus described my invention, what I claim is—

1. In a diffusion apparatus, the combination, with a diffusion-trough and an endless rake moving in the trough, of a fresh-water-supply pipe, a defecating-fluid-supply pipe, a valve in each pipe, a float rising and falling with the fluid in the diffusion-trough, and devices connecting the float with the two valves, substantially as described.

2. In a diffusion apparatus, the combination, with a diffusion-trough and an endless rake moving therein, of a fresh-water-supply pipe, a defecating-fluid-supply pipe, a valve arranged in each pipe and having a lever, a vessel in communication with the trough, a float rising and falling with the fluid in the vessel, and a rod connecting the float with the two valve-levers, substantially as described.

3. In a diffusion apparatus, the combination, with a diffusion-trough, a roller-mill at each end thereof, and an endless rake moving in the trough, of a fresh-water-supply pipe arranged to deliver the fresh water at one end portion of the trough, a defecating-fluid-supply pipe arranged to deliver the defecating-fluid at the opposite end of the trough, a juice-tray receiving the juice from the juice-expressing roller-mill and elevated above the lowest part of the trough, and a juice-pipe disconnected from and independent of the fresh-water-supply pipe and leading from the juice-tray to the trough for the continuous gravitation of juice from the tray to the trough, substantially as described.

4. In a diffusion apparatus, the combination, with a diffusion-trough, a roller-mill, and means for moving the fibrous material from the trough to the mill, of a water-supply pipe, a defecating-fluid-supply pipe, a valve in each pipe, a float rising and falling with the fluid in the diffusion-tank, and a lengthwise-adjustable rod connection between the float and the two valves, substantially as described.

In testimony whereof I have hereunto subscribed my name in the presence of two witnesses.

REGINALD MELVILL SANDYS.

Witnesses:
WALTER H. COOK,
ROBERT RIES.